United States Patent [19]
Krawczyk

[11] Patent Number: 5,367,371
[45] Date of Patent: Nov. 22, 1994

[54] OBSERVATION SPACE VEHICLE HAVING A LASER-BASED MEASUREMENT SYSTEM

[75] Inventor: Rodolphe Krawczyk, Antibes, France

[73] Assignee: Aerospatiale Societe Nationale Industrielle, Paris, France

[21] Appl. No.: 7,631

[22] Filed: Jan. 21, 1993

[51] Int. Cl.$^5$ .............................. G01P 3/36; G01C 1/00
[52] U.S. Cl. ................................ 356/28.5; 356/139.03
[58] Field of Search .................. 356/5, 1, 28.5, 152, 356/139.03

[56] References Cited

U.S. PATENT DOCUMENTS

| | | |
|---|---|---|
| 3,352,223 | 11/1967 | Garra . |
| 3,525,568 | 8/1970 | Dreyfus . |
| 3,741,653 | 6/1973 | Suetlinchny ........................ 356/5 |
| 3,984,685 | 10/1976 | Fletcher ........................... 250/339 |
| 4,518,254 | 5/1985 | Penny et al. ...................... 356/5 |
| 4,721,385 | 1/1988 | Jelalian et al. . |
| 5,231,401 | 7/1993 | Kaman et al. ...................... 342/55 |

FOREIGN PATENT DOCUMENTS 2607169 1/1977 Germany .

OTHER PUBLICATIONS

Carbon Dioxide Doppler Lidar Wind Sensor on a Space Station Polar Platform Allied Optics, Mar. 28, 1989, No. 5.

Primary Examiner—Stephen C. Buczinski
Attorney, Agent, or Firm—Remy J. VanOphem

[57] ABSTRACT

An observation spacecraft designed for the quantitative evaluation of the activity within a fluid mass borne by a planet embodying a platform adapted to follow an orbit around the planet and including a roll axis designed to be parallel with that orbit and a yaw axis designed to be oriented toward the center of the planet, and an observation assembly composed of a laser generator, a frequency measuring unit, and first and second telescopes, respectively equipped with a sight element having a sight axis designed to be orientated toward the planet; the telescopes are designed to send, from the laser generator, beams that are transmitted from along the sight axes, and to receive, along these axes, reflected beams which they then apply to the frequency measuring unit. The first and second sight elements are connected with the platform by means of rotary motors whose axes are parallel with the roll axis, the first and second sight axes projecting themselves in opposite directions along the roll axis.

21 Claims, 4 Drawing Sheets

OBSERVATION SPACE VEHICLE HAVING A LASER-BASED MEASUREMENT SYSTEM

BACKGROUND OF THE INVENTION

1. Field of the Invention

The present invention pertains to the observation, by laser and incoherent or non coherent detection of widespread fluid masses and to their characterization through the compilation of the parameter measurements taken in several areas of these masses. It particularly pertains to the measurement of atmospheric activities (such as wind speeds) on Earth and other planets.

2. Description of the Prior Art

Traditionally, a "lidar" or Light Detection and Ranging, which equivalent, as one skilled in the art knows, to radar in the field of optic wave lengths (generally, wavelengths of between 0.1 and 15$\mu$ or more), is used for the measurement of atmospheric activities. A lidar embodies a laser transmitter and a receiver including one or several telescopes equipped with a detection assembly to analyze the signal sent by a target illuminated by the laser beam; this target may be reflective, in the case of a telemetric or altimetric lidar, or diffuse in the case of atmospheric lidars.

The measurement of the atmospheric activity is taken in practice by coherent detection, using a mobile target indicator (also referred to as "DOPPLER lidar" in some cases), which means that, by comparing the frequencies of a local oscillator and the radiation received, one determines the amplitude of the component, based on the transmission reception direction, of the local wind speed.

In fact, several cases of coherent detection may be distinguished, depending on whether the shot transmission laser (or part thereof) is used as a local oscillator (coherent homodyne detection), or if a second laser is used as a local oscillator (heterodyne reception).

Such DOPPLER lidars are, among others, used for the "LAWS" project of the National Aeronautics and Space Administration (NASA), the "ALADIN" project of the European Space Agency (ESA), or "BEST" of the Centre National des Etudes Spatiales (CNES), all of which pertain to wind speed measurement by satellite coherent detection.

A lidar placed on board of a mobile craft in altitude (such as an airplane or, better yet, a satellite) allows for the exploration of the atmosphere over a wide area (which may encompass all of the Earth in the case of a polar orbiting satellite): this area is mainly covered by the motion of the mobile craft possibly combined with the scanning capabilities of the lidar. The two types of scanning presently used are: the cross-scanning, (perpendicular to the speed vector of the mobile) and the cone scanning around the nadir axis (axis connecting the mobile with the center of the Earth). In the case of the DOPPLER-based lidars designed to measure the wind speeds, the cone type scanning helps define two wind speed components (and, therefore, determine the orientation and amplitude of the wind speed), each area being scanned at a few seconds interval along two distinct sight axes. The cross scanning technique does not define two such components. It is generally admitted that the vertical component of the wind speed is insignificant, this explains why only two measurements, taken along two distinct sight axes, are required to reconstruct the wind vector.

This is shown for example on FIG. 1 which schematically illustrates the aforementioned LAWS project concept, (the ALADIN concept being still under development).

This figure represents a space platform 1, orbiting in this instance at an altitude of between 400 and 800 km, and shown at its $t_o$ time position. This platform includes, mounted on its lower face, a telescope 2 with a sight axis V—V and equipped with a telescope bracket 3 connected with the space platform by means of a rotary motor schematically represented at 4 and whose Z—Z axis is parallel to the nadir. The V—V sight axis on the telescope is tilted at an angle of $\theta$, the order of 45°, with reference to the Z—Z motor axis, thereby defining a Z—Z axis cone with a half angle 0 relative to the platform, while its print on the ground and within the ground strip being observed is a spiraling curve whose course is indicated under reference C.

If P is the ground point intercepted at time $t_o$ by the sight axis V—V, it is possible to measure, at the precise moment, the component of the wind speed above P along the V—V axis: this particular component is referenced $v_o$. The point P, or any point in the vicinity thereof, is again intercepted at a later time, at time $t_1$, upon which the sight axis V—V has become V'—V' due to the combined platform motion, V speed, and cone-scanning action of the telescope: at this time $t_1$, the component of the wind speed, referenced $V_1$, along the V'—V' axis has an orientation sufficiently different from $V_o$ to allow, in combination, for the determination of the horizontal wind speed (it being assumed in practice that, during the time interval separating the measurements $V_1$ and $V_o$, the wind speed does not vary by much). It should be noted that, for clarity, the curve C is not represented at the same scale as that of the platform, the width L of the explored strip representing tens or hundreds of kilometers, whereas the coils of this curve are, when the scanning period is short enough (as few as tens of seconds in the case of a polar orbit), much closer to one another and intertwined with one another, which allows for a full coverage of the strip observed.

It should be noted at this point that the laser transmission is not continuous, as it consists of a series of brief shots, typically lasting between $10^{-12}$ and $10^{-5}$ secs. each, usually sent at a low $10^{-15}$ frequency, typically at about several microsecond intervals (knowing that safety standards applying to the energy of each shot must be observed in order to avoid the hazardous glare in the eyes of an individual standing on the ground and who might be hit by such a shot).

FIG. 2 schematically illustrates the "BEST" project concept. The platform, referenced 1', is equipped in this case with four fixed telescopes 2a, 2b, 2c and 2d symmetrically arranged with reference to the plane of the orbit (sharing the same plane with V and Z—Z) and whose sight axes $V_a$—$V_a$, $V_b$—$V_b$, $V_c$—$V_c$ and $V_d$—$V_d$, respectively, are tilted at the same angle (45°) with reference to the vertical axis Z—Z, while their tilt angle with reference to one another is the same (90°). With this concept, only two lines $1_1$ and $1_2$, parallel with the orbit, are explored.

In the various cases where the platform is a satellite, the speed relative to the Earth is significant, (about 7 km/s in the case of a sun synchronous polar orbit) and, when combined with a cone scanning action, adds an additional and significant DOPPLER delay between the transmission and the reception; this delay may vary, based on the angle between the platform speed and the instant orientation of the sight axis, as illustrated on FIG. 1 (its value being maximum when the sight axis is included in the same plane containing speed vector V and axis Z—Z, and nil when the sight axis is in a plane perpendicular with the speed). The maximum value may vary with the scanning angle since it results from $(2V/\lambda)\cdot\sin 0$ (where V is the satellite speed, $\lambda$ the transmission wavelength, 0 the half-angle of the scanning cone), which produces a frequency shift of ±1 to 10 GHz for a wavelength comprised between 1 and 10$\mu$, the most usual range for lidars, and a 45° scanning angle.

The weak return signal received explains, in several cases, why a coherent detection method is used as opposed to a direct detection method: its complexity notwithstanding, it is the only technique which offers performances meeting the scientific requirements in the case of wind speed measurements taken from space (with a virtual accuracy of approximately one meter per second).

The DOPPLER frequency shift, however, presents a disadvantage in the case of coherent detection: the output signal of the detector, wherein the electric field produced by the reflected wave and the one produced by the local oscillator, used as a reference, are superposed, is proportional to $[k(v_s - v_{ol})]$, where $v_s$ and $v_{ol}$ respectively represent the reflected signal frequency and the local oscillator frequency. It has been stated that this signal may vary from ±1 to 10 GHz during scanning at a 45° angle; however, in order to attain accuracy on a frequency variating over such a large range, good dynamics are required and which are not at all compatible with the dynamics offered by the present detectors (or those presently under development). This frequency shift must be compensated for prior to the reception, either on the transmitting laser or on the local oscillator, which seems a priori easier since the requirements applying to the oscillator, frequency stability excepted, are generally less demanding than those imposed on the transmitting laser. However, this compensation makes the reception channel (or the transmission channel, if the laser and the local oscillator share a common oscillator) all the more complex. A 1 m/s accuracy translates into a frequency accuracy on the order of 1 to 10 MHz for a wavelength comprised between 1 and 10$\mu$ and a scanning angle of 45°: the compensation error should be therefore less than 1/1000 of the compensation itself.

In the case of the direct detection (without comparison to a local reference), a problem is likewise encountered due to the fact that the reception filters must be sensitive enough (in the aforementioned case and where wind speeds reach about 100 m/s, the sensitivity range is less than a few tens of MHz) on a variation range of 1 to 10 GHz due to the DOPPLER of the platform: the incompatibility of these requirements requires the tuning (which may vary depending on the scanning angle) of one or all receiving filters.

No simple solution has, therefore, been found to date to meet these accuracy objectives.

It should be noted that if the satellite borne wind speed measuring lidar projects call for cone scanning and coherent detection (such as "LAWS" by NASA and "ALADIN" by ESA), using a single telescope, the "BEST" project developed by CNES calls for fixed telescopes, which eliminates the variable tuning problem but, as seen above, there is an adverse effect on the coverage of the explored areas (without the scanning it is only possible to cover two lines in parallel with the satellite course) and the total mass and volume of the instrument.

SUMMARY OF THE INVENTION

The present invention is designed to alleviate the aforementioned disadvantages and to allow for the measurement, from an orbiting platform, of uniformly distributed points of a fluid mass located on the surface of a planet (such as wind speed measurements on the surface of the Earth) using DOPPLER lidars, with or without coherent detection capabilities, and whose sight angles produce within strips of this fluid mass a scanning at least partially transverse to the instant course of the platform, without requiring a variable tuning of the transmission laser or of the local oscillator (in case of coherent detection) nor of the reception filter(s), (in case of direct detection) without directly penalizing the mass or the overall dimensions.

In order to eliminate the drawbacks of the DOPPLER shift variations, the invention calls for a fixed shift. It therefore calls for a scanning angle, constant with reference to the satellite speed. Cross scanning is a particular example, whereby the angle measures 90° and the DOPPLER shift is nil. At an angle between 0° and 90° (typically 45° for an orbiting altitude between 400 and 800 km as is the case for polar orbits), the scanning action may be performed forward or backward. Since the wind speed measurement calls for two distinct sight directions for the areas explored, the simplest solution is to use two telescopes, one with forward scanning action and the other with backward scanning action. Since the lasers operate continuously on orbit, and all of the shots shall be directed to the Earth, the number of shots directed to the Earth may be optimized by a rotation which is oscillating around the cone angle instead of being uniform with the shots interrupted. This pendulum motion (already considered in other atmospheric lidars such as "ATLID" in the case of ESA, wherein the sight axis is scanned in an oscillating fashion and in a plane perpendicular with the orbit) must be perfectly balanced in order not to cause perturbations on the satellite: with a single telescope, it is desirable to minimize the mass in motion and to use a countercoupling wheel rotating in a synchronous motion and in the opposite direction. There appears to be a second advantage in using two telescopes which are animated in a counterrotary motion as each one of the telescopes may act as a countercoupling wheel for the other, which reduces the total mass compared with that of two independent telescopes. In a simpler fashion, and in order to minimize the masses in motion, it is also possible to provide for two fixed telescopes with the scanning action being performed by two scanning mirrors which are respectively associated with the telescopes, the two mirrors also preferably being counterrotating.

It should also be noted that the invention departs from the traditional reaction of one skilled in the art when confronted with a parasite variation source (as is the case for the DOPPLER shift variations due to the satellite speed) and which consists in researching a nearly nil mean amplitude for these parasite variations. Instead, the invention makes allowances for this source of perturbations while making the amplitude of the same constant, even if this constant amplitude has a significant value.

More precisely, the invention pertains to an observation space vehicle designed to quantitatively characterize, using the DOPPLER effect, the activity taking place within a planet borne fluid mass, including a platform designed to follow an orbit around this planet, having a roll axis to be parallel to the orbit and a yaw axis to be orientated toward the center of the planet, and an observation assembly embodying a laser generator, a first telescope equipped with a sight piece having a sight axis designed to be orientated toward the planet and adapted to send, from the laser generator, a beam along the sight axis and to pick up a reflected beam along the axis, and a frequency measuring unit. The observation assembly also includes a second telescope equipped with a second sight piece having a second sight axis, and adapted to send, from the laser generator, a beam transmitted along the second sight axis, and to pick up a reflected beam along the second sight axis and apply it to the frequency measuring unit. The first and second sight pieces are connected with the platform by means of rotary motors with axes parallel to the roll axis, the first and second sight axes having opposite projections along the roll axis.

The present invention has several advantages over the traditional solutions:

Relative to the mobile telescope concept (LAWS), the need for the variable tuning of the local oscillator or transmitting laser is eliminated; the DOPPLER shift resulting from the satellite speed is constant and may be compensated for by properly adjusting the wavelength of the transmitting laser or that of the local oscillator, or by a fixed shift of the central lengths of the filters in the case of direct detection. Additionally the countercoupling reaction wheel is eliminated for each telescope.

Relative to the fixed telescopes concept (BEST) two telescopes are utilized instead of four and the area covered is substantially larger.

It should be noted that, since tuning is not required, the invention may easily be applied to coherent homodyne reception (in the case wherein the transmitting laser and the oscillator share a common part), which results in less constraints upon the thermal stability of the part, than in coherent heterodyne detection (where the transmitting laser and the local oscillator are independent). In the first case, temperature fluctuations of the common part, which similarly affect the frequencies of the transmitting laser and of the local oscillator, are less objectionable to temperature variations which independently affect the aforesaid frequencies in the second case.

Therefore, the preferred construction of the invention calls for, and may combine the following components.

The rotary motors are of the oscillating type.

The rotary motors are controlled oscillating in opposite phase.

The oscillation period is between 1 and 100 sec. (in the case of planets other than the Earth, the orbiting altitudes may vary, and the oscillating periods as well).

The laser generator includes a single laser source for both telescopes, as well as a tilt mirror, oscillating or not, and the frequency measuring unit is a single measuring channel for both telescopes and the tilt mirror, the tilt mirror being designed for an alternate optical coupling of the laser source and measuring channel with one, then the other telescope.

The laser generator includes a laser source for each Telescope and the frequency measuring unit includes a measuring channel for each telescope.

The sight pieces are optics which are rigidly mounted with the telescopes and the telescopes are connected with the platform by means of the rotary motors.

The sight pieces are mirrors which are mobile with reference to the telescopes, the latter being rigidly mounted on the platform.

The frequency measuring unit is of the coherent detection type.

The frequency measuring unit is of the direct detection type.

The first and second sight axes are tilted between 20° and 90°, preferably between 40° and 50°, with reference to the roll axis.

The invention also pertains to a laser observation device, designed for the quantitative characterization, by DOPPLER effect, of the activity taking place within a planet borne fluid mass, designed to be moved by a carrier vehicle following a course located above the fluid mass having a reference axis to be parallel to the course and including a mounting plate for its mounting onto the carrier vehicle, a laser generator, a first telescope equipped with a sight piece having a sight axis to be orientated toward the planet, designed to send, from the laser generator, a beam transmitted along the sight axis and to pick up a reflected ray along the same axis, and a frequency measuring unit. The observation device further includes a second telescope equipped with a second sight piece having a second sight axis and designed to send, from the laser generator, a beam transmitted along the second sight axis and to apply it to the frequency measuring unit. The first and second sight pieces are connected with the mounting plate by rotary motors whose axes are parallel with the reference axis, the first and second sight axes projecting themselves in opposite directions along the reference axis.

The laser observation device may be carried by a space vehicle or by a high altitude airplane.

The same preferred features described above apply to this device.

Objects, specifications and advantages of the invention will be apparent from the following detailed description taken in conjunction with the attached drawings.

DETAILED DESCRIPTION OF THE PREFERRED EMBODIMENT

Figure 1:
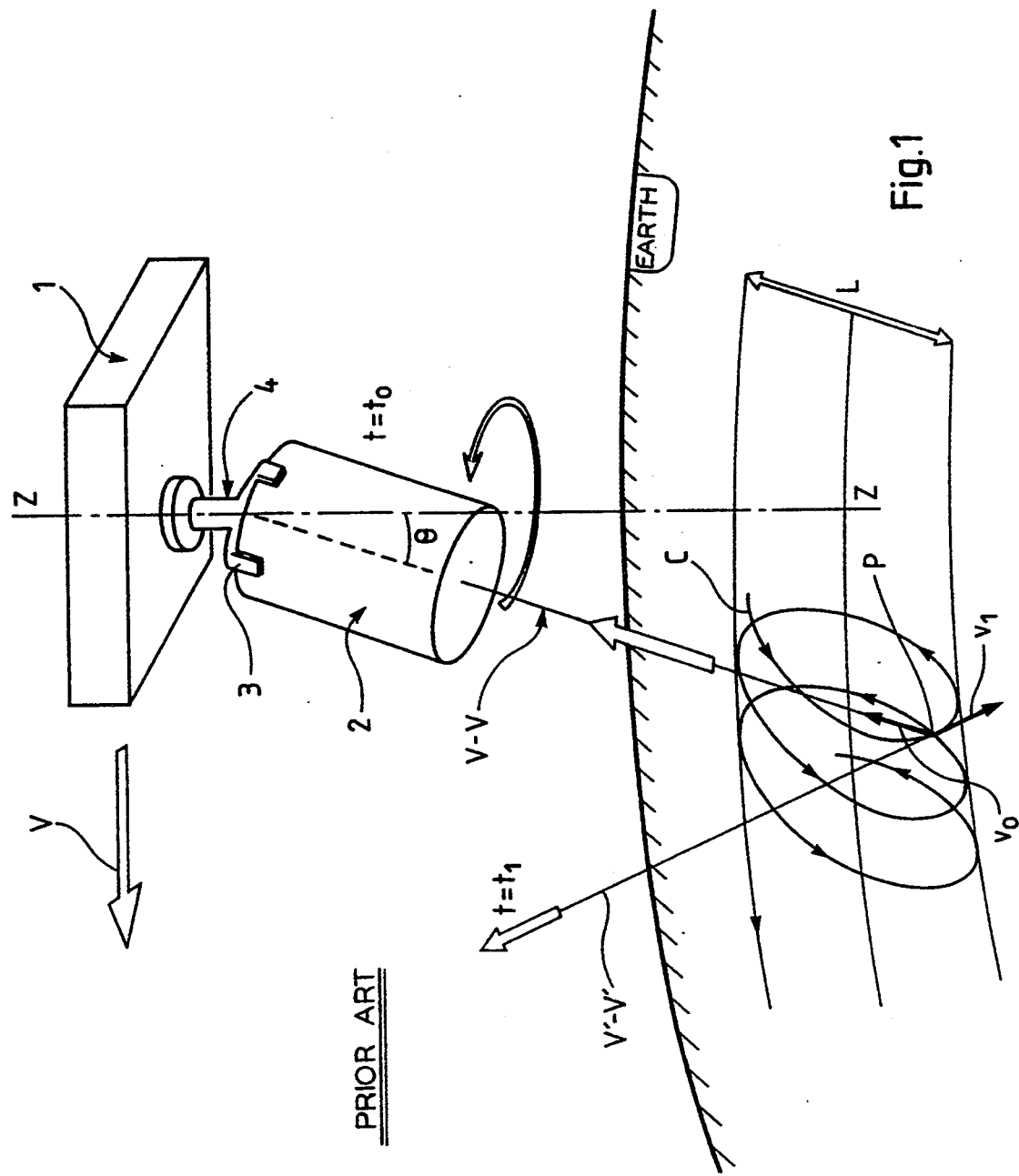
FIG. 1 is a schematic view of a prior art concept for the characterization of winds utilizing a cone scanning telescope.
Figure 2:
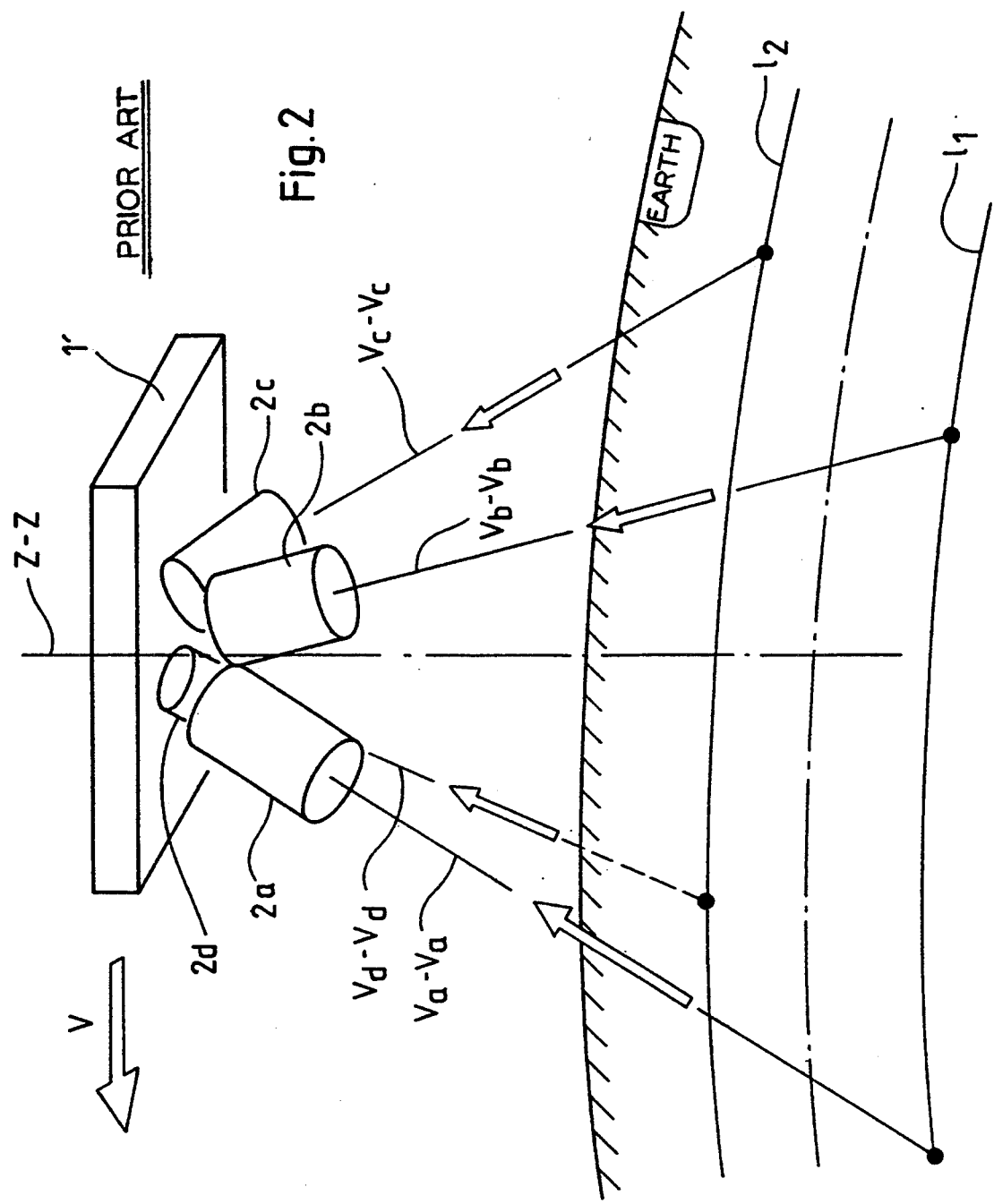
FIG. 2 is a schematic view of another prior art concept for the characterization of winds, utilizing four fixed telescopes.
Figure 3:
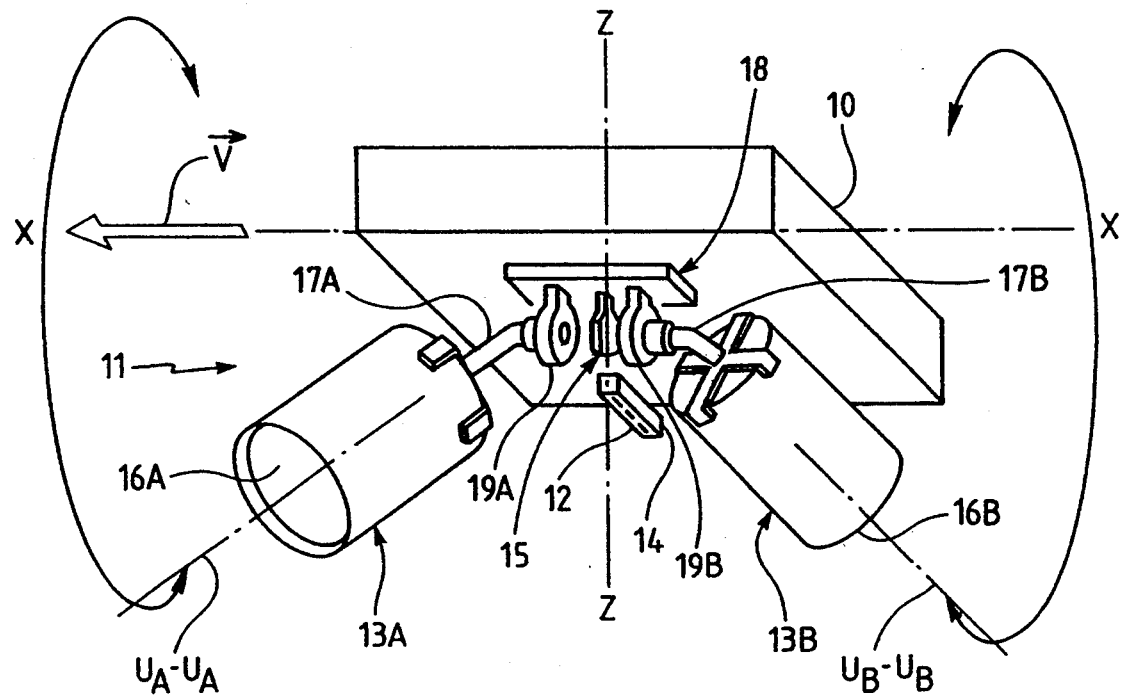
FIG. 3 is a schematic perspective view of a laser observation satellite according to the invention.
Figure 4:
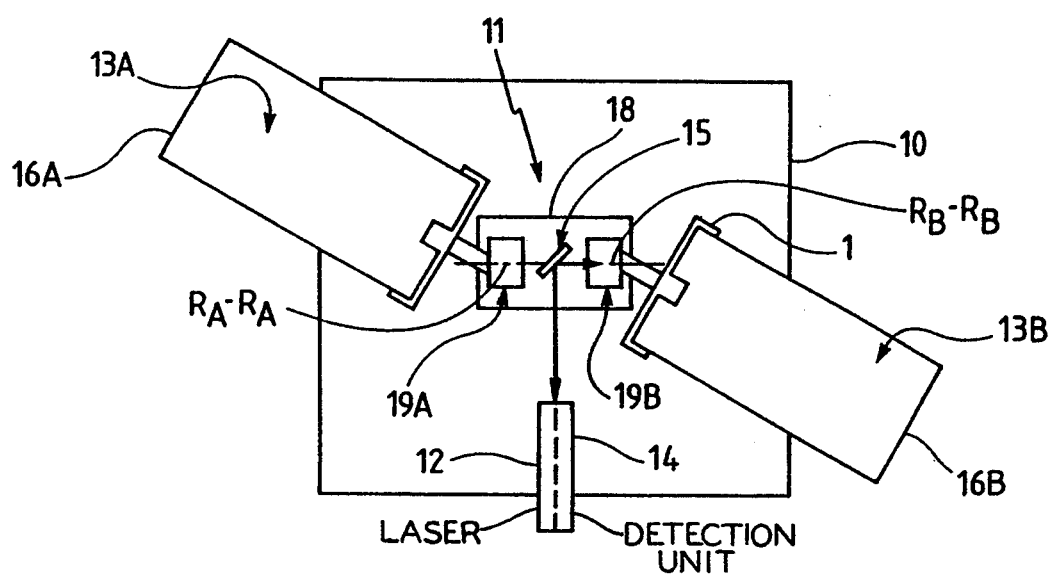
FIG. 4 is a bottom view of the laser observation satellite of FIG. 3.

As indicated in FIGS. 3 and 4, a satellite according to the invention includes a platform 10 with a roll axis x—x, which is substantially parallel to the direction in which the satellite is designed to move at a speed V, and a yaw axis z—z parallel to the local vertical (orientated toward the center of the Earth or more generally toward the center of the planet being observed).

Since it is not part of the invention in itself, the platform 10 will not be described in detail as it is of any appropriate known type. It suffices to say that the platform 10 includes in particular an orbital control and attitude stabilization system, as well as a power source which may be fed by solar generators.

A laser observation assembly 11 is mounted underneath the platform, namely on an earthside face of the platform.

The laser observation assembly 11 includes a laser source 12, two telescopes 13A and 13B, as well as a frequency measuring channel 14. As will be apparent to those skilled in the art, the distinction between the laser source 12 and the frequency measurement channel 14 of FIGS. 3 and 4 is substantially nonexistent.

The assembly of the laser source 12 and the frequency measuring channel 14 is complete with a tilt mirror 15 which, in this case, has an axis parallel with the yaw axis, considering the relative positions of the telescopes, of the laser source, and of the measuring channel. The tilt mirror is designed to alternately couple the assembly with one or the other of the telescopes.

Combined with the mirror, the laser source 12 constitutes a general laser generator for the overall laser observation assembly 11, whereas the frequency measuring channel 14 combined with the mirror constitutes a measurement detection unit for the entire laser observation assembly 11.

The telescopes 13A and 13B are provided with sight pieces 16A and 16B, which presently consist of fixed output optics with reference to the remainder of the telescopes. These sight pieces have sight axes respectively referenced $U_A$—$U_A$ and $U_B$—$U_B$ designed to pick up the mass to be characterized (the Earth atmosphere in this case). However, it should be noted that the "fixity" of these optics does not prevent them from showing the usual light angular displacements designed to compensate for the lag angle due to the motion of the satellite between the shot and the reception of a reflected beam.

The sight axes have a tilt angle relative to the roll axis of between 20° and 80°, desirably 40° to 50° and preferably equal to about 45°.

With reference to the platform, the sight pieces 16A and 16B are rotary mounted around axes $R_A$—$R_A$ and $R_B$—$R_B$ paralleling the roll axis (the axes preferably being merged). Therefore, and considering the fact that these pieces are fixed within the telescopes, the telescopes are mounted on telescope brackets 17A and 17B which are connected, with a support plate 18 attached to the platform, by means of two rotary motors 19A and 19B respectively rotating around the axes $R_A$—$R_A$ and $R_B$—$R_B$. The rotary motors are preferably controlled in oscillation with such an amplitude as to keep the sight axes directed to the fluid mass to be characterized. Those skilled in the art know how to determine the maximum value of this amplitude, based on the altitude, the tilt angle and the width of the strip of fluid mass to be explored upon each revolution of the satellite (the amplitude generally being between 40° and 50°).

The sight axes project themselves in opposite directions relative to the roll axis (either in the same direction as V or in the opposite direction) so that with reference to the orbiting direction of the satellite (parallel with the roll axis) it can be said that one of the telescopes points forward, whereas the other points to the rear.

The laser generator 12 transmits short laser impulses (of 1 μsec duration for instance) at a given frequency (about 10 Hz for instance).

In the illustrated example, the mirror 15 oscillates at 90° on this same frequency (or a multiple thereof) between a first position wherein laser impulses are sent to (while reflected beams are picked up by) one of the telescopes, and a second position wherein laser impulses are set to (and the reflected beams are picked up by) the other telescope.

Although the telescopes' oscillations have a very low frequency (the scanning period lasting e.g. from 10 to 20 seconds) they cause satellite unbalances which are all the more significant as the telescopes are heavier and larger (this is the case for instance when the telescopes have a 1 meter diameter and an aperture of f/2 where f is the focal distance, which typically corresponds to an animated mass of several tens of kilograms).

In order to avoid these unbalances, both telescopes are preferably driven in oscillation in the opposite phase mode (in other words, motors 19A and 19B are counter-rotating).

Figure 5A:
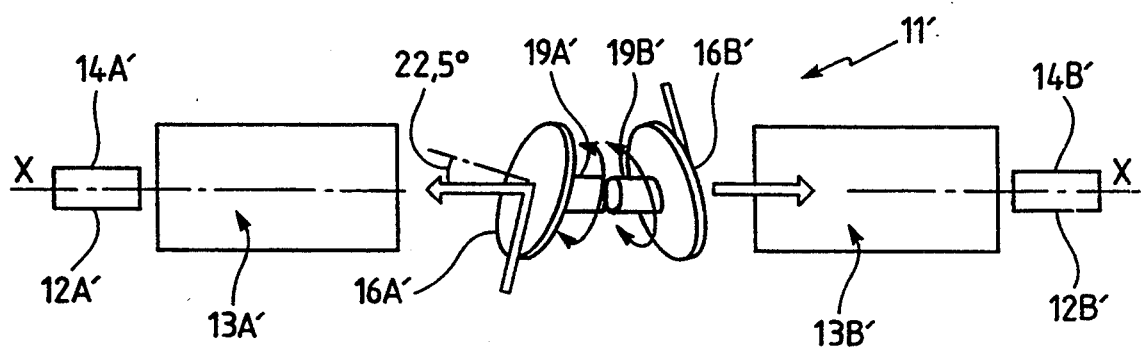
FIGS. 5A and 5B are partial bottom views of two other satellites according to the invention.
Figure 5B:
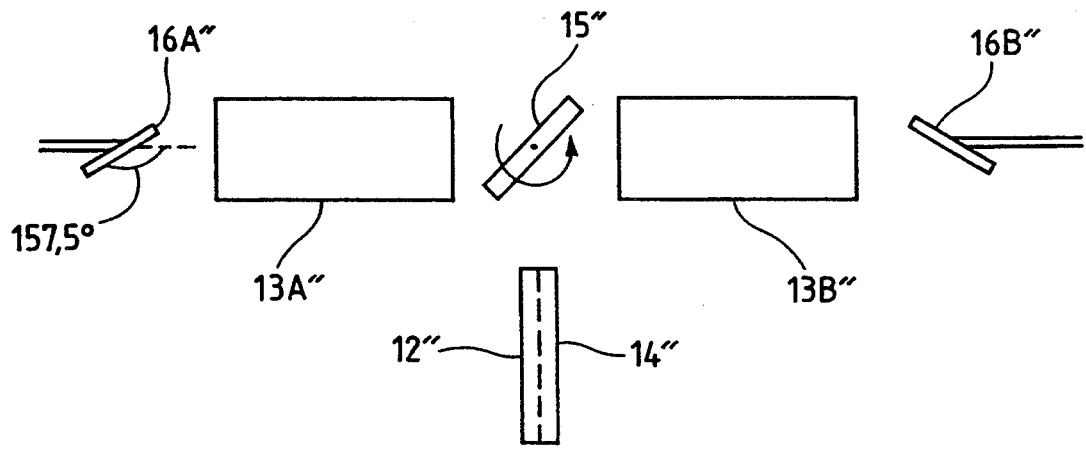

FIGS. 5A and 5B are partial views of the possible variations of the invention, all references similar to those of FIGS. 3 and 4 bearing the symbols "prime" and "double prime".

The common trait between these two variations is that both sight pieces are movable with respect to the telescopes, which are fixed with respect to the platform while being oriented parallel to the roll axis. These sight pieces are simple mirrors so that masses in movement are substantially less than in the case of FIGS. 3 and 4, so that the control of the oscillations in phase opposition becomes of less significance.

As illustrated in FIG. 5A, the sight pieces 16A' and 16B' are composed of mirrors placed between the coaxial telescopes 13A' and 13B', with a tilt angle of 22.5° with reference to their common rotation axis, namely axis x—x, which leads, as depicted in FIGS. 3 and 4, to a 45° scanning cone semi-angle.

In this variation, the telescopes 13A' and 13B' are respectively equipped with laser sources 12A' and 12B' and frequency measurement channels 14A' and 14B'; the whole laser generator assembly composed of these two sources and of the frequency measuring units resulting from the combination of both channels is functionally equivalent to the assembly of FIGS. 3 and 4 composed of the laser source 12, frequency measuring channel 14, and tilt mirror 15.

The variation illustrated in FIG. 5B is closer to the subject illustrated in FIGS. 3 and 4 in that the laser source 12", the frequency measurement channel 14" and the tilt mirror 15" assembly represented in FIG. 5B have the same construction as the assembly of FIGS. 3 and 4. Unlike the arrangement shown in FIG. 5A, the mirrors 16A" and 16B" are located on either side of the telescope assembly 13A" and 13B", respectively, and are tilted at an angle of approximately 180°-22.5° from the roll axis.

In fact, the laser sources 12, 12A', 12B' and 12" and the frequency measuring channels 14, 14A', 14B' and 14" are of any known type and will not be detailed herein. Preferably, these channels are of the coherent detection type, that is using (as stated in the foregoing) a local oscillator whose frequency is preferably used as a reference to compare the frequency of the signal picked up by the sight elements. Even though this reference frequency is preferably different from the transmission frequency, so as to be as close as possible to the foreseeable frequency of the picked-up signal considering the DOPPLER effect produced by the speed of the satellite, it should be noted that the cone scanning (preferably oscillating) proposed by the invention around the roll axis, makes this shift fixed and simplifies the construction of the local oscillator since its frequency may remain constant. A direct detection, without comparison to a reference frequency, remains of course a possibility within the scope of the invention.

Figure 6:
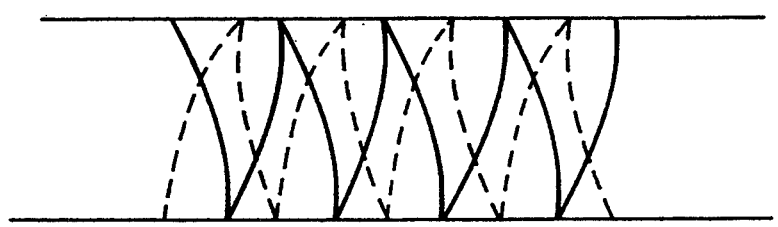
FIG. 6 is a schematic view of the sight axes ground trace of a satellite according to the invention.

FIG. 6 depicts, within a strip being explored within the liquid mass, the traces left by both sight axes of an observation system as described in any one of FIGS. 3 through 5B. The solid line represents the "front" telescope sight axis trace, whereas the interrupted line represents the trace of the "rear" telescope sight axis. One can check the existence of a large number of intersection points between both traces, especially since this schematic figure grossly overestimates the pitch of these traces.

As an example, the laser used is a $CO_2$ laser (9 $\mu$m wavelength) and its power impulses are between 1 and 5J, while the shot frequency amounts to 2 to 10 Hz.

The invention has been described by way of a nonexhaustive example and it will be apparent to one skilled in the art that numerous variations thereof may be proposed which would still fall within the scope of the invention. Accordingly, the scope of the invention is to be limited only by the following claims:

What is claimed is:

1. An observation space vehicle for quantitatively evaluating, a fluid mass above a surface of a planet while said observation space vehicle orbits said planet along an orbital path, said observation space vehicle comprising:
    a platform having a roll axis which is substantially parallel to said orbital path and a yaw axis which approximately intersects the center of said planet, said platform having a forward end and a rearward end relative to a direction of travel of said observation space vehicle along said orbital path;
    means supported by said platform for generating a laser beam;
    first and second telescopes supported by said platform;
    first sight means operatively associated with said first telescope for relaying said laser beam toward said planet along a first sight axis and for receiving a first reflected laser beam along said first sight axis, said first sight axis being oriented in a first direction toward said forward end of said platform such that said first telescope is a forward scanning telescope;
    first means supported by said platform for pivoting said first sight means about an axis which is substantially parallel to said roll axis;
    second sight means operatively associated with said second telescope for relaying said laser beam toward said planet along a second sight axis and for receiving a second reflected laser beam along said second sight axis, said second sight axis being oriented in a second direction toward said rearward end of said platform such that said second telescope is a rearward scanning telescope;
    second means supported by said platform for pivoting said second sight means about an axis substantially parallel to said roll axis; and
    means operatively associated with said first and second sight means for measuring and evaluating a frequency of said first and second reflected laser beams.

2. An observation space vehicle according to claim 1 wherein said first and second pivoting means are oscillating rotary motors.

3. An observation space vehicle according to claim 2 wherein said first pivoting means oscillates in an opposite phase relative to said second pivoting means.

4. An observation space vehicle according to claim 3 wherein said first and second pivoting means oscillate so as to have an oscillation period of between about 1 and about 100 seconds.

5. An observation space vehicle according to claim 1 wherein said laser beam generating means comprises a single laser source and a mirror, rotatably mounted relative to said single laser source, said mirror alternately optically connecting said single laser source and said measuring means with said first and second telescopes.

6. An observation space vehicle according claim 1 wherein said laser beam generating means comprises a laser source for each of said first and second telescopes, and wherein said measuring and evaluating means comprises a measuring unit for each of said first and second telescopes.

7. An observation space vehicle according to claim 1 wherein said first and second sight means are optics rigidly mounted to each of said first and second telescopes, said first and second telescopes being connected to said platform with a corresponding one of said first and second pivoting means.

8. An observation space vehicle according to claim 1 wherein said first and second sight means are mirrors which are rotatably mounted relative to said first and second telescopes, said first and second telescopes being rigidly mounted to said platform.

9. An observation space vehicle according to claim 1 wherein said measuring and evaluating means is a coherent detection device.

10. An observation space vehicle according to claim 1 wherein said measuring and evaluating means is a direct detection device.

11. An observation space vehicle according to claim 1 wherein said first and second sight axes each have a tilt angle of between about 20° and about 80° relative to said roll axis.

12. An observation space vehicle according to claim 11, wherein said tilt angles are each between about 40° and about 50°.

13. A laser observation device for quantitatively evaluating, a fluid mass above a surface of a planet while said laser observation device is transported by a vehicle which is moving along a path above said surface, said laser observation device comprising:
    a platform having a roll axis which is substantially parallel to said path, said platform having a forward end and a rearward end relative to a direction of travel of said vehicle along said path;
    means supported by said platform for generating a laser beam;
    first and second telescopes supported by said platform;
    first sight means operatively associated with said first telescope for relaying said laser beam toward said planet along a first sight axis and for receiving a first reflected laser beam along said first sight axis, said first sight axis being oriented in a first direction toward said forward end of said platform such that said first telescope is a forward scanning telescope;

first means supported by said platform for pivoting said first sight means about an axis which is substantially parallel to said roll axis;

second sight means operatively associated with said second telescope for relaying said laser beam toward said planet along a second sight axis and for receiving a second reflected laser beam along said second sight axis, said second sight axis being oriented in a second direction toward said rearward end of said platform such that said second telescope is a rearward scanning telescope;

second means supported by said platform for pivoting said second sight means about an axis substantially parallel to said roll axis; and means operatively associated with said first and second sight means for measuring and evaluating a frequency of said first and second reflected laser beams.

14. A laser observation device according to claim 13 wherein said first and second pivoting means are oscillating rotary motors.

15. A laser observation device according to claim 13 wherein said laser beam generating means comprises a single laser source and a mirror rotatably mounted relative to said single laser source, said mirror alternately optically connecting said single laser source and said measuring means with said first and second telescopes.

16. A laser observation device according to claim 13 wherein said laser beam generating means comprises a laser source for each of said first and second telescopes, and wherein said measuring and evaluating means comprises a measuring unit for each of said first and second telescopes.

17. A laser observation device according to claim 13 wherein said first and second sight means are optics rigidly mounted to each of said first and second telescopes, said first and second telescopes being connected to said platform with a corresponding one of said first and second pivoting means.

18. A laser observation device according to claim 13 wherein said first and second sight means are mirrors which are rotatably mounted relative to said first and second telescopes, said first and second telescopes being rigidly mounted to said platform.

19. A laser observation device according to claim 13 wherein said measuring and evaluating means is a coherent detection device.

20. A laser observation device according to claim 13 wherein said measuring and evaluating means is a direct detection device.

21. A laser observation device according to claim 13 wherein said first and second sight axes each have a tilt angle of between about 20° and about 80° relative to said roll axis.

* * * * *

UNITED STATES PATENT AND TRADEMARK OFFICE
CERTIFICATE OF CORRECTION

PATENT NO. : 5,367,371
DATED : November 22, 1994
INVENTOR(S) : Rodolphe Krawczyk It is certified that error appears in the above-indentified patent and that said Letters Patent is hereby corrected as shown below:

```
Column 3, line 9, after "1" insert ----    ----.

Column 5, line 67, delete "Telescope" insert ---- telescope ----.

Column 8, line 9, delete "set" insert ---- sent ----.

Column 9, line 32, delete ---- , ----.

Column 10, line 52, delete ---- , ----.
```

Signed and Sealed this

Twenty-eight Day of February, 1995

Attest:

BRUCE LEHMAN

*Attesting Officer*      *Commissioner of Patents and Trademarks*